US012479225B2

(12) United States Patent
Toudmeri et al.

(10) Patent No.: US 12,479,225 B2
(45) Date of Patent: Nov. 25, 2025

(54) PRINTING APPARATUS AND METHOD OF OPERATION

(71) Applicant: Dover Europe Sàrl, Vernier (CH)

(72) Inventors: Mohammed Jamal Toudmeri, Birmingham (GB); David Anthony Troman, Nottingham (GB)

(73) Assignee: Dover Europe Sàrl, Vernier (CH)

( * ) Notice: Subject to any disclaimer, the term of this patent is extended or adjusted under 35 U.S.C. 154(b) by 277 days.

(21) Appl. No.: 18/313,095

(22) Filed: May 5, 2023

(65) Prior Publication Data

US 2023/0356538 A1 Nov. 9, 2023

(30) Foreign Application Priority Data

May 5, 2022 (GB) ..................................... 2206604

(51) Int. Cl.

*B41J 35/02* (2006.01)
*B41J 2/165* (2006.01)
*B41J 35/26* (2006.01)

(52) U.S. Cl.

CPC ............... *B41J 35/02* (2013.01); *B41J 2/165* (2013.01); *B41J 35/26* (2013.01); *B41J 2/16502* (2024.05)

(58) Field of Classification Search

CPC ... B41J 35/02; B41J 2/165; B41J 35/26; B41J 2/16502; B41J 29/13; B41J 2/315; B41J 29/17; B41J 29/393

USPC .......................................................... 347/108

See application file for complete search history.

(56) References Cited

U.S. PATENT DOCUMENTS

2003/0202037 A1* 10/2003 Therien ................ B41J 2/16523 347/36

FOREIGN PATENT DOCUMENTS

| | | |
|---|---|---|
| CN | 212889518 | 4/2021 |
| GB | 2507877 | 10/2014 |
| JP | S5590391 | 7/1980 |
| JP | 2004034411 | 2/2004 |

OTHER PUBLICATIONS

Extended European Search Report in European Appln No. 23171742.2, dated Aug. 21, 2023, 4 pages.
Search Report in Great Britain Appln. No. 2206604.7, mailed on Nov. 4, 2022, 3 pages.

* cited by examiner

*Primary Examiner* — Jason S Uhlenhake
*Assistant Examiner* — Alexander D Shenderov
(74) *Attorney, Agent, or Firm* — Fish & Richardson P.C.

(57) ABSTRACT

A casing for a printing apparatus can include a body having a printing opening, and a cover member having an aperture, wherein the cover member is moveable relative to the body between an open position in which the aperture of the cover member is substantially aligned with the printing opening of the body, and a closed position in which at least a part of the cover member substantially closes the printing opening of the body. Further, a printing assembly can include a printing apparatus and a casing, the casing providing ingress protection for the printing apparatus. Finally, a control system for such a printing assembly, and a method of operation of such a printing assembly are provided.

20 Claims, 7 Drawing Sheets

PRINTING APPARATUS AND METHOD OF OPERATION

FIELD

The present invention relates to a printing assembly, including a printing apparatus and a casing for a printing apparatus, a control system for such a printing assembly and a method of operation of a printing assembly or parts thereof.

BACKGROUND

Printing apparatuses such as thermal transfer over-printers are routinely used on production lines for printing on to packaging and the like. Such production lines, particularly food packaging lines, for example, may be required to be cleaned on a regular schedule and this typically involves the use of sprayed liquids. Such liquids, if allowed to come into contact with the internal components of a printing apparatus, may cause damage to the printing apparatus, potentially leading to malfunction and/or reduced lifespan of the printing apparatus. Hazardous situations may also occur, which may cause damage to other parts of the production line and/or injury to personnel. It will be understood that the ingress of solids, for example dust, may also cause damage to internal components of a printing apparatus, and therefore ingress protection against solids and/or liquids for reasons other than cleaning operations may be desirable.

It is known in the art to enclose printing apparatuses in a waterproof bag or hood during cleaning of production lines. However, this method is time consuming as each printing apparatus needs to be manually covered. Further, additional storage space would be needed for the covers, making this method undesirable. An alternative method of protecting printing apparatuses during production line cleaning is to remove the or each printing apparatus from the production line during the cleaning process. Not only is this method time consuming and labour intensive, but it risks damaging the printing apparatus, and requires correct reinstallation after the cleaning process. Incorrect reinstallation of the printing apparatus can lead to errors, wasted time, and wasted materials/products, for example. It is also known in the art to exchange one or more functional parts of the printer with dummy parts during cleaning, to protect sensitive components. Again, this method is time consuming and labour intensive, and there is an inherent risk of incorrect reinstallation.

It is also necessary to clean the printheads of printing apparatuses, for example thermal transfer overprinters. A thermal transfer printhead is involved in high temperature printing processes. When the printhead comes into contact with an ink ribbon coated with a layer of ink, heating elements within the printhead are activated to melt the ink on the ribbon and cause its transfer to a target substrate. This can cause a small amount of waste material to be burnt off from the ink ribbon and deposited on the printhead. Therefore, a daily cleaning regime is usually recommended.

An aim of the present disclosure is to provide an improved printing assembly and/or parts thereof, and a method of operation of such a printing assembly and/or parts thereof.

SUMMARY

Representative features are set out below, which stand alone or may be combined, in any combination, with one or more features disclosed in the text and/or drawings of the specification.

There is provided a casing for a printing apparatus, the casing including a body having a printing opening, and a cover member having an aperture, wherein the cover member is moveable relative to the body between an open position in which the aperture of the cover member is substantially aligned with the printing opening of the body, and a closed position in which at least a part of the cover member substantially closes the printing opening of the body.

The casing may include a movement mechanism for moving the cover member relative to the body.

The movement mechanism may include at least one roller around which a part of the cover member is able to be wound.

The movement mechanism may include at least one engagement member provided on the cover member, and at least one respective opening in the body, wherein a part of the or each engagement member extends through its respective opening.

Movement of the cover member relative to the body may be controlled or controllable manually and/or mechanically and/or electrically.

When the cover member is in the closed position relative to the body, the cover member may provide protection against the ingress of solids and/or liquids into the casing.

The cover member may include a cleaning portion for cleaning a printhead.

There is also provided a printing assembly including a printhead and a casing having any combination of features described above and/or in the detailed description and/or in the claims set out below.

There is also provided a control system for a printing assembly, wherein the control system includes a control device which is operable to control the movement of the cover member relative to the body.

The control device may be operable to control a plurality of printing assemblies.

There is also provided an operation method of a printing assembly including a casing as described herein, wherein the method includes controlling the movement of the cover member relative to the body of the casing, between the open position and the closed position.

The operation method may include controlling movement of the printhead between a printing position and a non-printing position.

The operation method may include a printhead cleaning operation.

The printhead cleaning operation may include at least one or any combination of the following steps:

- moving the cover member to a closed position relative to the body;
- positioning the cleaning portion adjacent or near the printhead;
- moving the printhead and the cover member relative to one another, by movement of one or both of the cover member and the printhead;
- moving the cover member relative to the body to move the cover member to an open position relative to the body.

The operation method may include controlling the operation of a plurality of printing assemblies.

BRIEF DESCRIPTION OF THE FIGURES

In order that the present disclosure may be more readily understood, preferable embodiments thereof will now be described, by way of example only, with reference to the accompanying drawings, in which.

DETAILED DESCRIPTION

Figure 1:
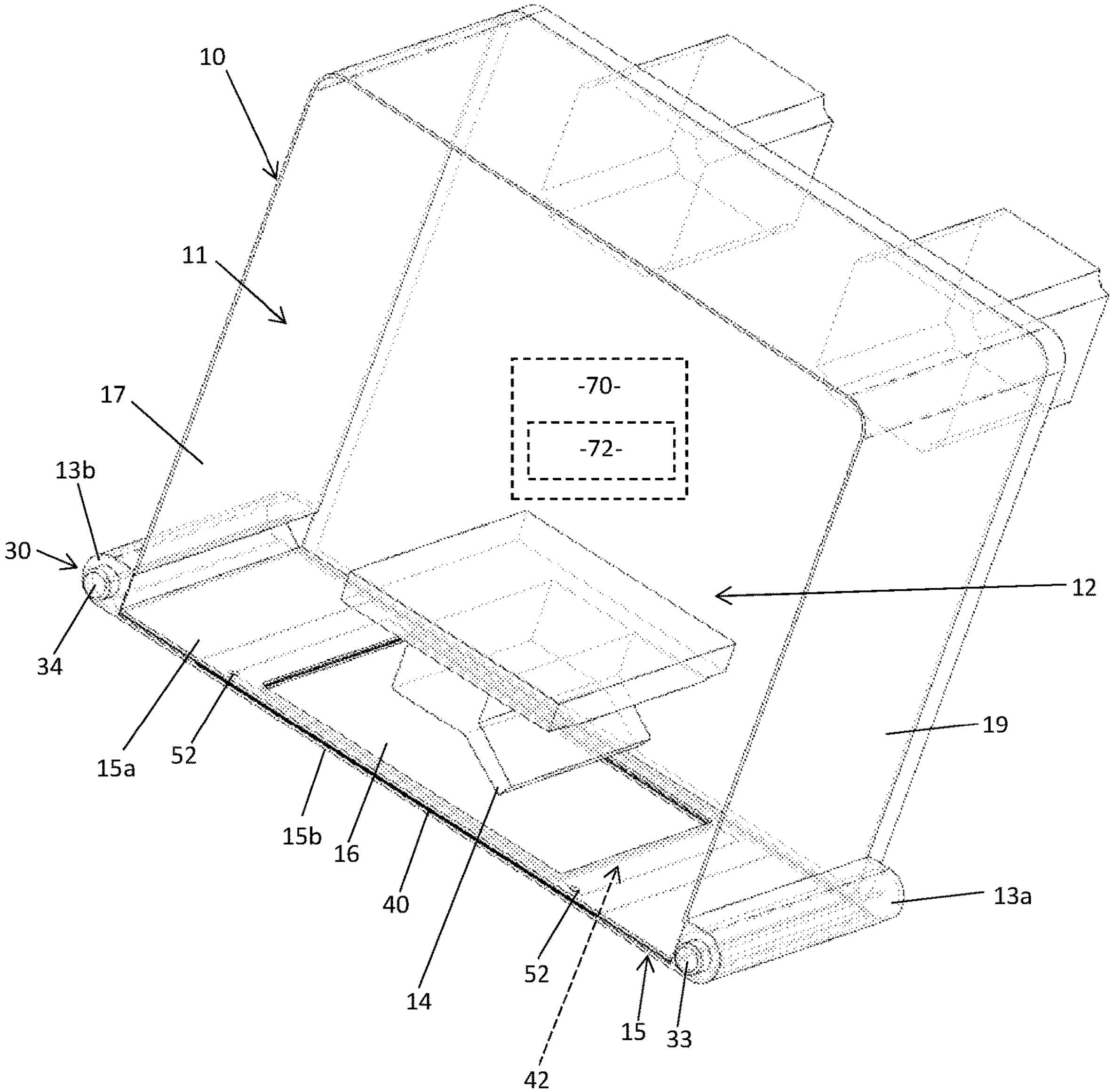
FIG. 1 is a cross sectional perspective view of a part of a printing assembly including a casing with a cover member in an open position.
Figure 4:
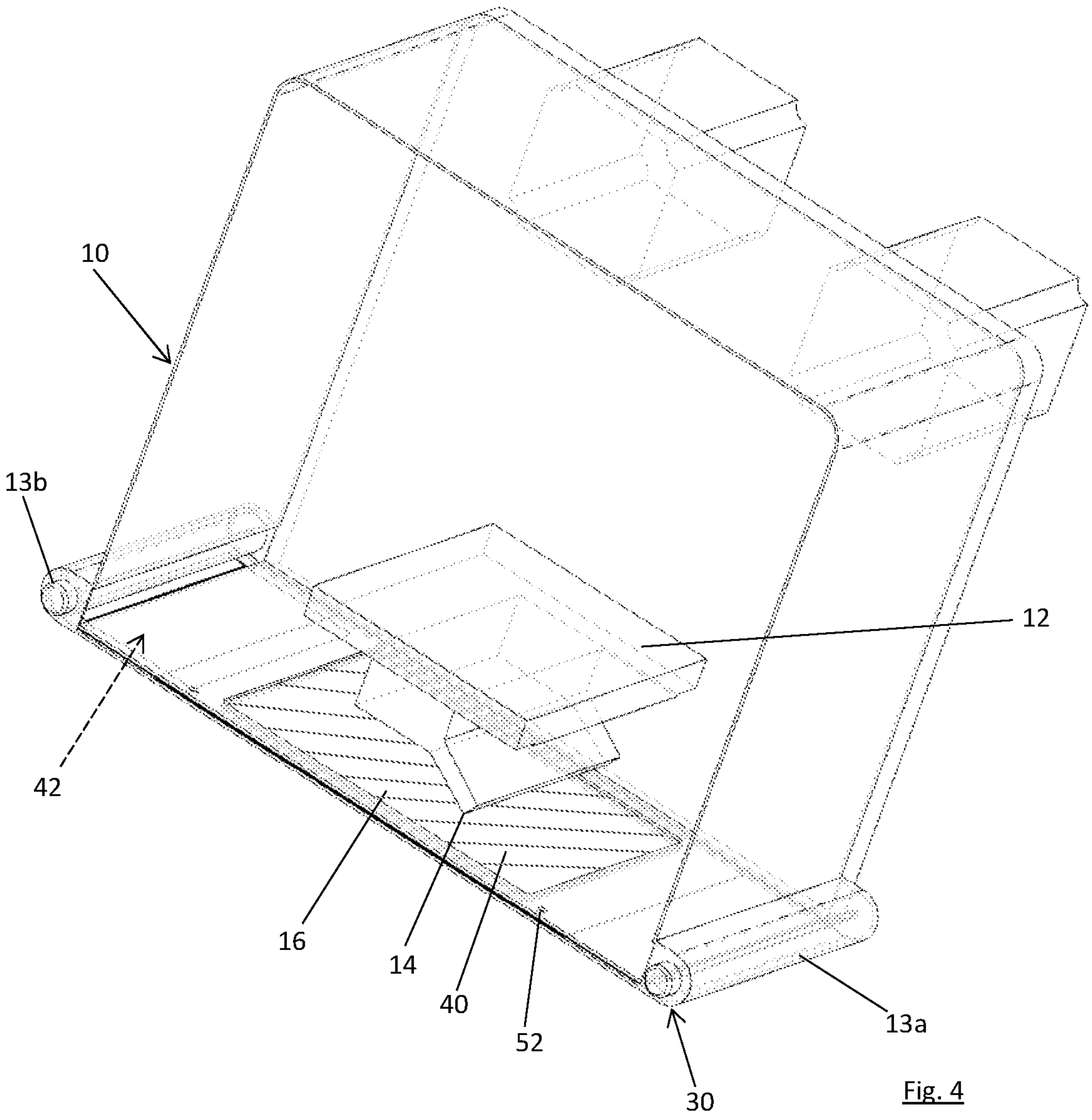
FIG. 4 is a cross sectional perspective view of the casing of FIG. 1, with the cover member in a closed position.

Referring to FIG. 1 and FIG. 4, for example, there is shown a part of a printing assembly which includes a casing 10 which is configured to house at least a part of a printing apparatus 12 (only part of which is shown in the figures). The casing includes a body 11 which may be moulded or formed by attaching a plurality of wall components together. Where wall components are attached together, additional sealing methods or components may be utilised to inhibit the ingress of liquids and/or solids between the wall components. A portion of the body 11 may have a double-walled or double-skinned configuration, or the whole body 11 may be double-walled.

Figure 3:
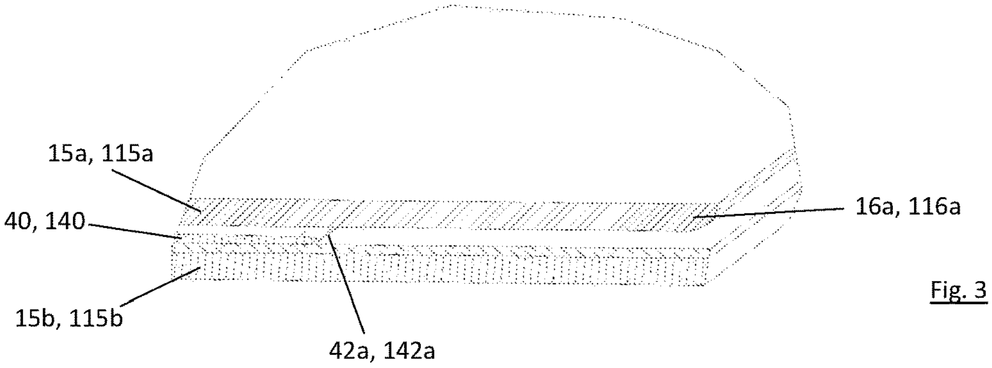
FIG. 3 is a cross-sectional view of a part of a wall of a body of the casing and a part of the cover member of FIG. 1.

The body 11 includes a printing opening 16. The opening 16 may be provided in a first wall 15 of the body 11. The first wall 15 may be double-walled, having an inner wall 15*a* and an outer wall 15*b*. The opening 16 may be provided in the inner wall 15*a* and the outer wall 15*b*. The perimeter of the opening 16 may have smoothed edges 16*a*, as shown in FIG. 3, for example. The edges 16*a* of the opening 16 may be radiused. The edges 16*a* of the opening 16 may be chamfered. The edges 16*a* of the opening 16 may be chamfered and radiused. The body 11 may also include side walls 17, 19. Each of the side walls 17, 19 may be connected to the first wall 15.

FIGS. 1 and 4 are cutaway views of the part of the printing assembly. It will be understood that the body 11 may be a closed body with the exception of the printing opening 16. The body 11 may be closed by engagement with a part of the printing apparatus 12 or another device. For example, the printing apparatus 12 may include a cassette upon which are mounted reels of inked ribbon, and the body 11 may be configured to engage with a part of the cassette so as to close the body 11. The printing opening 16 may be the only means of ingress into the body 11 when the casing 10 is in use, the body 11 being otherwise sealed. A sealing formation, for example a gasket, may surround at least a part of perimeter of the printing opening 16.

The printing apparatus 12 may include a printhead 14. The printhead 14 may be moveable relative to the casing 10 between a printing position and a housed position. The printhead 14 may also be moveable to a cleaning position. The cleaning position may be a housed position. The printhead 14 may be moveable relative to the casing 10 such that in a printing position at least a part of the printhead 14 extends through the printing opening 16, to enable the printing apparatus 12 to carry out a printing operation on a substrate located approximately adjacent but external to the casing 10. In the housed position, the printhead 14 may be positioned inside the casing 10. It will be understood that the whole of the printhead 14 may be positioned inside the casing 10 when the printhead 14 is in the housed position. It will be understood that other positions of the printhead 14 relative to the casing 10 are possible. The printhead 14 may move between the printing position and a non-printing position while in use, for example. It may not be necessary or desirable for the printhead 14 to retract into the casing 10 during every non-printing operation. Such printing apparatuses typically operate at very high speeds, and it is advantageous to minimise the amount of movement of the printhead between printing operations, so as to enable printing speeds to be optimised.

The casing 10 may be configured to house additional components of the printing apparatus 12, for example rotatable spools for carrying reels of inked ribbon and/or motors and/or other moveable and/or electronic components (not shown).

The casing 10 includes a cover member 40. Features of the cover member 40 are shown in detail in FIGS. 2A-2C, for example. The cover member 40 has a first face 40*a*, and a second face 40*b*. The cover member has a width W and a length L, measured between a first end 40*c* of the cover member 40 and a second end 40*d* of the cover member 40. The first face 40*a* may be an inner face of the cover member 40, at least a part of which, in use, is directed towards the inside of the body 11. The second face 40*b*, may be an outer face of the cover member 40, at least a part of which, in use, may be directed to face outwardly relative to the body 11. The cover member 40 may include a plurality of layers. The cover member may include a flexible sheet of material. The cover member 40 may include a water-resistant or waterproof portion. The whole of the cover member 40 may be water-resistant or waterproof. The cover member 40 may be manufactured from or include a portion that is formed from a polymer. The cover member 40 may be manufactured from or include a portion that is formed from closed cell foam. The cover member 40 or a portion thereof may be compressible. The cover member may be integral with the casing.

The cover member 40 includes an aperture 42. The aperture 42 of the cover member 40 may be configured to be a similar size and or shape to the printing opening 16 of the body 11. The edges 42*a* of the perimeter of the aperture 42 may be smoothed, for example chamfered and/or rounded, for example as shown in FIG. 3.

The cover member 40 may include a sealing arrangement 44. The sealing arrangement 44 may include one or more of a sealing member 45 and a plug member 46. The sealing member 45 may be in the form of a gasket or thickened portion of the cover member 40 which at least partially surrounds the perimeter of the aperture 42. The sealing member 45 may be attached to either face 40*a*, 40*b* of the cover member 40, or may, for example, be sandwiched between layers of the cover member 40.

The plug member 46 may include a portion of material which may be configured to be a similar shape and/or or size to the printing opening 16. The plug member 46 may be spaced from the aperture 42, or may be positioned adjacent the aperture 42. The plug member 46 may be a thickened portion of the cover member 40. The plug member 46 may be provided on the first or second face 40*a*, 40*b* of the cover member 40, or may be provided as an intermediate layer between the first and second faces 40*a*, 40*b* of the cover member 40.

The cover member 40 may include one or more reinforcement members 48 to strengthen the cover member 40. The or each reinforcement member 48 may be provided in the region of the aperture 42. The or each reinforcement member 48 may be in the form of a strip of stiffening material extending lengthwise or widthways along the cover member 40 on each side of the aperture 42. The aperture 42 may be surrounded by reinforcement members 48.

The cover member 40 may be attached to the body 11 or otherwise mounted for movement relative to the body 11. The cover member 40 may be sandwiched between the inner wall 15*a* and the outer wall 15*b* of the first wall 15.

The cover member 40 is moveable between a first, closed position and a second, open position relative to the body 11. In the first, closed position, a portion of the cover member 40 substantially covers the printing opening 16 of the body 11. It will be appreciated that more than one position of the cover member 40 relative to the body 11 may provide a closed position. In the second, open position, at least a part of the aperture 42 is aligned with the printing opening 16.

The casing 10 may include a movement mechanism 30 for moving the cover member 40 relative to the body 11.

Figure 2A:
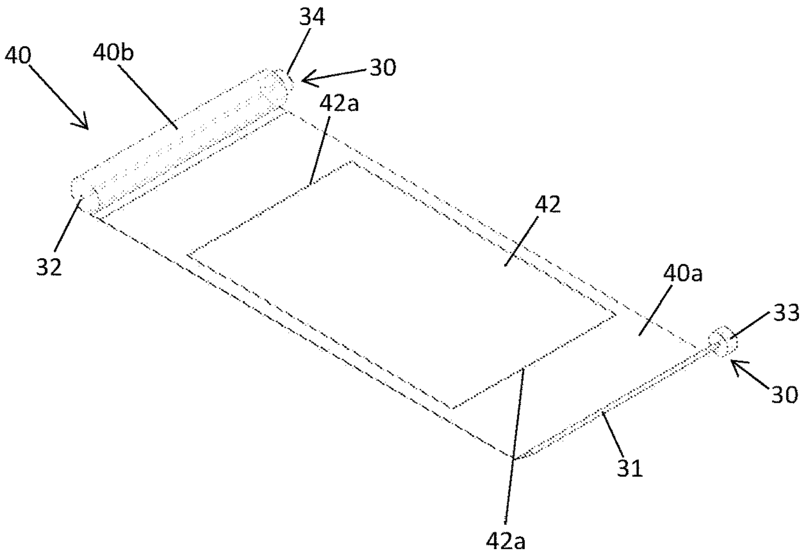
FIG. 2A is an illustrative perspective view of the cover member and movement mechanism of the casing of FIG. 1.
Figure 2B:
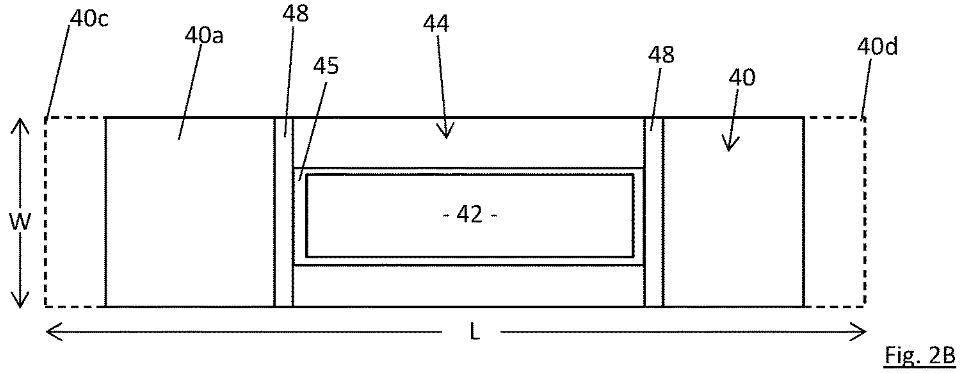
FIG. 2B is an illustrative plan view of a first face of the cover member.
Figure 2C:
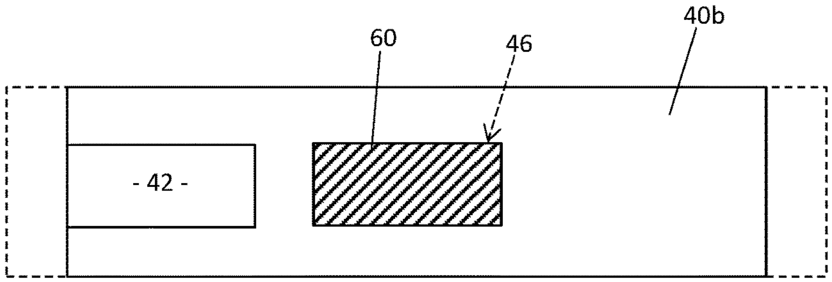
FIG. 2C is an illustrative plan view of a second face of the cover member.

The movement mechanism 30 may include at least one roller. The movement mechanism 30 may include a pair of rollers 31, 32 (as shown in FIGS. 1, 2A and 4, for example). The movement mechanism 30 may include an operating member. The operating member may include one or more rotatable knobs 33, 34. The or each rotatable knob 33, 34 may be manually and/or mechanically and/or electrically rotatable. The or each roller 31, 32 may be electrically operable, for example, each roller 31, 32 may be rotatable by one or motors. The movement mechanism 30 may be controlled by a control device 72 which may be operable to control the movement mechanism 30 automatically (for example following a timed or programmed routine), or in response to an input or signal, which may be an operator input and/or a feedback signal. The control device may control the movement mechanisms 30 of a plurality of casings 10. The control device 72 is shown in dashed lines since its position is not significant. It may be positioned internally or externally of the casing 10.

The or each roller 31, 32 may be housed inside the casing 10, for example inside the body 11. The body 11 may include a pair of roller housings 13*a*, 13*b*, each of which is configured to receive one of the rollers 31, 32 and at least a portion of the cover member 40.

The first end 40*c* and the second end 40*d* of the cover member 40 may be attached to a respective one of the rollers 31, 32, such that rotation of the rollers 31, 32 effects winding and unwinding of the cover member 40 on to and off the rollers 31, 32, to cause movement of the cover member 40 between the rollers 31, 32.

In use, the body 11 of the casing 10 is positioned around the at least a part of the printing apparatus 12 to provide a printing assembly. A part of the printing apparatus 12 (e.g., a cassette plate) may be positioned adjacent the body 11, to substantially close the casing 10. The cover member 40 may be manually or automatically positioned in a default position. The default position of the cover member 40 may be the open position or the closed position. In the open position, the aperture 42 of the cover member 40 is at least partially aligned with the printing opening 16, such that a part of the printing apparatus 12 (i.e., at least a part of the printhead 14) may extend at least partially through the printing opening 16 and the aperture 42 of the cover member 40. In the open position of the cover member 40, the printing apparatus 12 may carry out a printing operation on to a substrate which may be located externally of the casing 10.

The control device 72 may control movement and/or printing operations of the printhead 14.

When the cover member 40 is in the open position, the portion of the cover member adjacent the aperture 42 may surround the printing opening 16 of the body 11, and seal against the body 11, so as to inhibit the ingress of dust and/or liquids between the cover member 40 and the body 11. The material of the cover member may be compressed between the inner and outer walls 15*a*, 15*b* of the body 11 to seal around the aperture 42.

When the cover member 40 is to be moved to the closed position, the rollers 31, 32 are rotated to move the cover member 40 relative to the body 11. The direction of rotation of each roller 31, 32 to effect the desired movement will be dependent on how each end 40*c*, 40*d* of the cover member 40 is attached to its corresponding roller 31, 32. Each end 40*c*, 40*d* of the cover member 40 is windable on to and off its respective roller 31, 32 by rotation of at least one of the rollers 31, 32. It will be understood that rotating only one of the rollers 31, 32, may be sufficient to pull the cover member 40 in the desired direction, thus winding the cover member 40 on to that roller 31, 32, and unwinding a similar or substantially the same amount of the cover member 40 off the other roller 31, 32.

Where provided, the smoothed (e.g. chamfered/radiused) edges 16*a* of the printing opening 16, and/or the smoothed (e.g. chamfered) edges 42*a* of the aperture 42 of the cover member 40 protect against the cover member 40 catching, snagging or becoming ruckled as the cover member 40 moves relative to the body 11. For example, a smooth edge of the aperture 42 is able to slide over a smooth edge of the printing opening 16 more easily than a flat or blunt edge of the aperture 42 will slide over a flat or blunt edge of the printing opening 16. Where the first wall 15 is double walled, it will be understood that the edges 42*a* of the aperture 42 which extend widthways, i.e. across the width W of the cover member 40 are required to slide between the inner and outer walls 15*a*, 15*b* as the edges 42*a* of the aperture 42 move past the edges 16*a* of the printing opening 16. Smoothing one or both of the edges 16*a* of the printing opening 16 and the edges 42*a* of the aperture 42 has the effect of guiding each edge 42*a* of the aperture 42 between the inner and outer walls 15*a*, 15*b*, and reducing the risk of snagging, tearing or otherwise damaging the cover member 40.

The or each roller 31, 32 may be rotated by manual rotation of the or each respective knob 33, 34. Additionally or alternatively, the cover member 40 may be moved in response to a signal, for example an electrical signal provided by a control device 72, and/or a feedback signal. The control device 72 may operate one or more motors to rotate one or both rollers 31, 32 to carry out movement of the cover member 40 relative to the body 11 between the first and second positions.

It will be understood that for the purposes of ingress protection, it is desirable for the printing apparatus 12 to be positioned inside the body 11 when the cover member 40 is moved towards the closed position, at least, to avoid obstructing or damaging the cover member 40. However, there may be circumstances in which it is desirable to move the printing apparatus towards a printing position when the cover member 40 is in the closed position, for example for the purpose of cleaning the printhead 14, as will be explained below.

When the cover member 40 is in the closed position relative to the body 11, the cover member 40 covers or substantially covers the printing opening 16 of the body 11, such that the casing 10 is sealed.

In the closed position, the second face 40*b* of the cover member 40 is positioned sufficiently closely to the body 11, for example the cover member 40 is sandwiched sufficiently tightly between the inner wall 15*a* and the outer wall 15*b* of the first wall that the printing opening 16 is adequately sealed by the cover member 40, so as to meet the desired ingress protection (IP) rating. Where at least a part (for example a layer) of the cover member 40 is manufactured from a compressible material, for example closed cell foam, the cover member 40 is compressed against the body 11, for example the perimeter of the printing opening 16, so as to provide an adequate seal. It will be understood that the seal may be broken by operation of the movement mechanism 30. In other words, the seal is a temporary seal.

In the closed position, where provided, the plug member 46 may be substantially aligned with the printing opening 16. The plug member 46 may engage with the printing opening 16 so as to enhance the seal between the cover member 40 and the body 11, so as to protect against the ingress of solids and/or liquids into the casing 10 when the cover member 40 is in the closed position.

To move the cover member 40 to the open position relative to the body 11, the movement mechanism 30 may be operated in reverse compared with the movement to move the cover member 40 to the closed position. For example, if the rollers 31, 32 are rotated clockwise to move the cover member 40 from the open position to the closed position, anticlockwise rotation of the rollers 31, 32 may move the cover member 40 from the closed position to the open position. It will be understood that further rotation of the rollers 31, 32 in the same direction as the direction which moved the cover member 40 to the open position may enable the cover member 40 to be moved to an alternative closed position.

Figure 5:
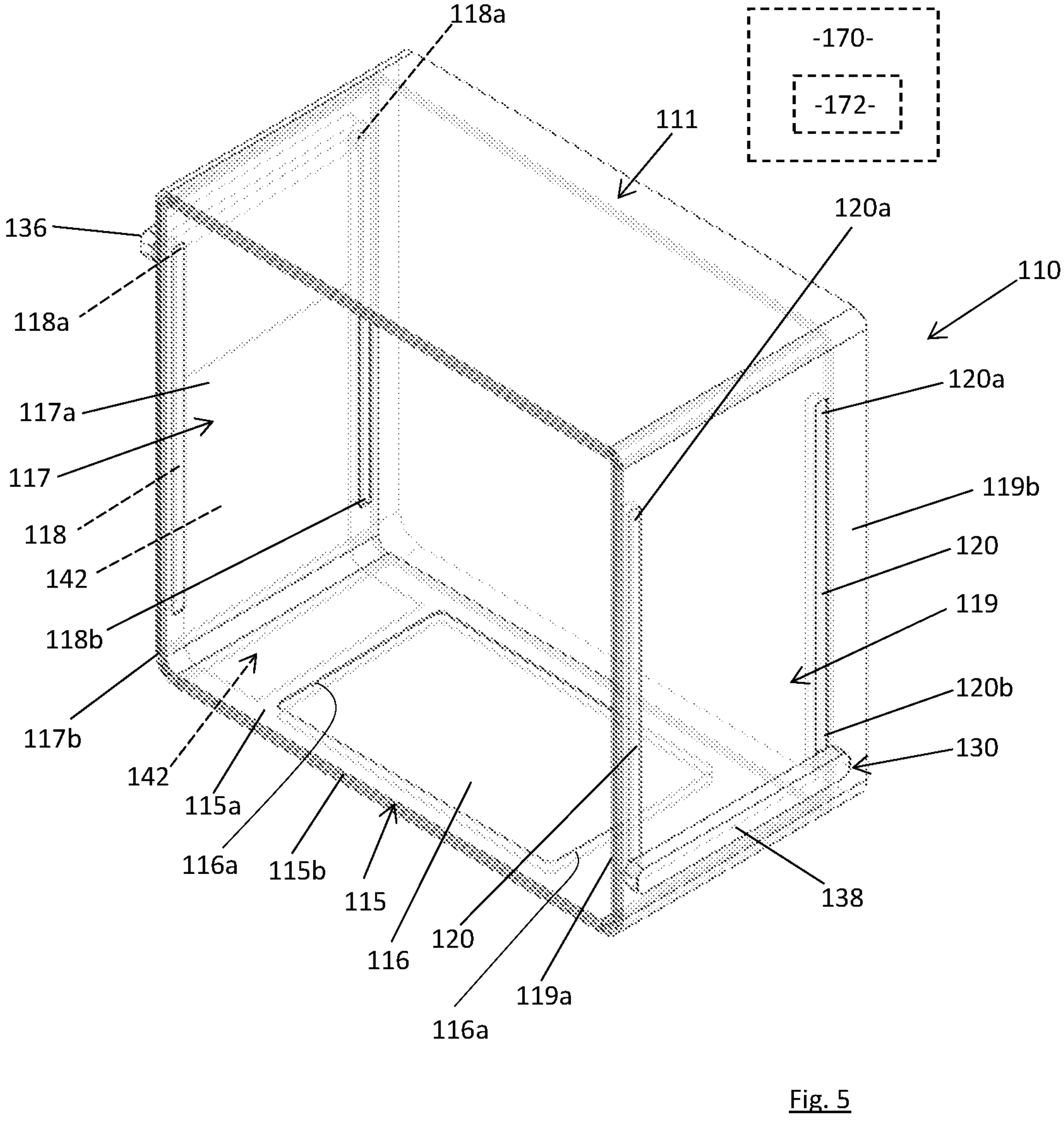
FIG. 5 is a perspective view of a part of a printing assembly including an alternative with a cover member in a closed position.

An alternative casing 110 is shown in FIG. 5, for example. The casing 110 is configured to house at least a part of a printing apparatus 12. The features of the printing apparatus 12 may be identical to those described above.

The casing 110 includes a body 111 which may be moulded or formed by attaching a plurality of wall components together. Where wall components are attached together, additional sealing methods or components may be utilised to inhibit the ingress of liquids and/or solids between the wall components. The body 111 may be double-walled or may include a double walled portion. The body 111 includes a first wall 115. The body 111 may include a first side wall 117 and a second side wall 119.

The body 111 includes a printing opening 116. The printing opening 116 may be provided in the first wall 115. The perimeter of the opening 116 may have smoothed edges 116*a*. The edges 116*a* of the opening 116 may be radiused. The edges of the opening 116*a* may be chamfered. The edges 116*a* of the opening 116 may be chamfered and radiused for the reasons outlined above. The first wall 115 may be double-walled, having an inner wall 115*a* and an outer wall 115*b*. The first side wall 117 and/or the second side wall 119 may be double-walled, having respective inner walls 117*a*, 119*a* and respective outer walls 117*b*, 119*b*. It will be understood that the body 111 may be a closed body with the exception of the printing opening 116. The body 111 may be closed by engagement with a part of the printing apparatus 12 or another device. For example, the printing apparatus 12 may include a cassette upon which are mounted reels of inked ribbon, and the body 111 may be configured to engage with a part of the cassette so as to close the body 111. The printing opening 116 may be the only means of liquid and/or particle ingress into the body 111 when the casing 110 is in use, the body 111 being otherwise sealed.

As explained above, the printhead 14 may be moveable relative to the casing 110 between a printing position and a housed position in which the printhead 14 is positioned inside the body 111. The printhead 14 may also be movable to a cleaning position. The cleaning position may be a housed position. The casing 110 may be configured to house additional components of the printing apparatus 12, for example rotatable spools for carrying reels of inked ribbon and/or motors and/or other moveable and/or electronic components (not shown).

Figure 6:
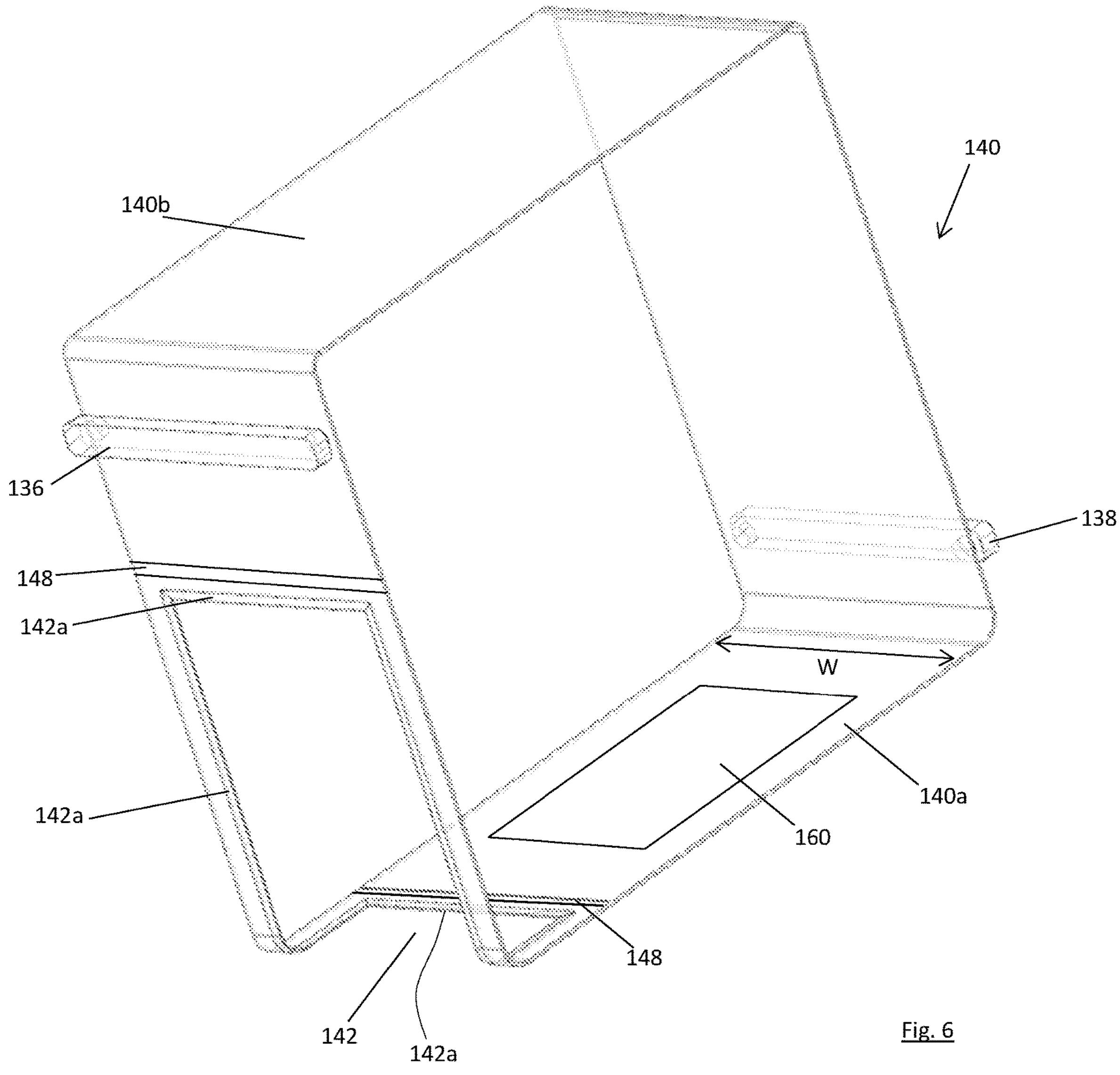
FIG. 6 is a perspective view of the cover member of FIG. 5.
Figure 7:
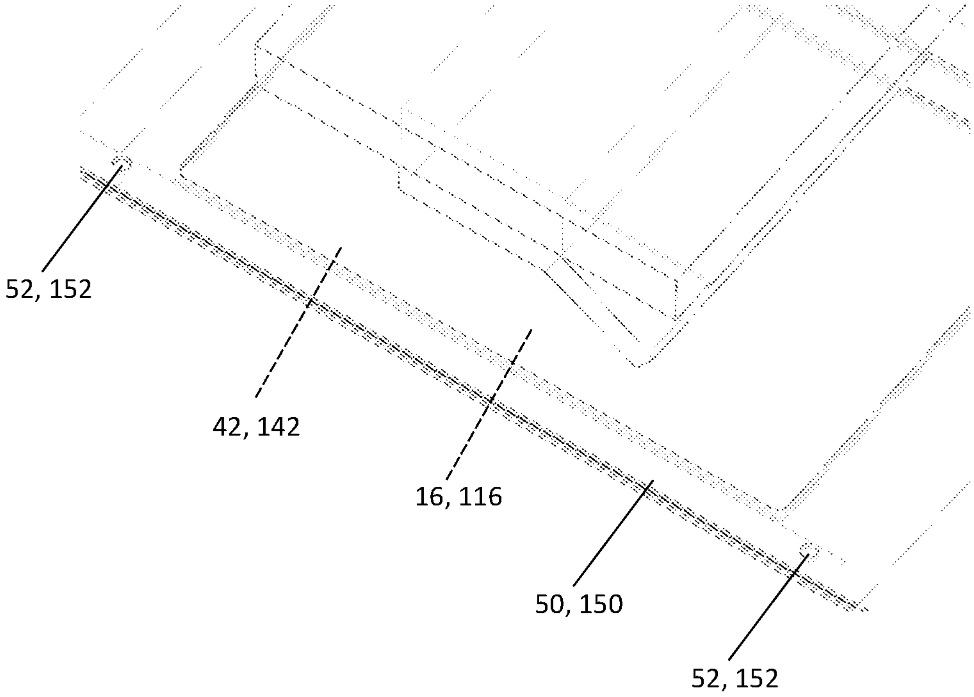
FIG. 7 is a perspective view of a part of the casing of FIG. 1 or FIG. 5.

The casing 110 includes a cover member 140. The cover member 140 has a first face 140*a*, and a second face 140*b*. The cover member 140 may be formed as a substantially continuous loop, for example as shown in FIG. 6. The cover member 140 may have a width W. The first face 140*a* may be an inner face of the cover member 140, at least a part of which, in use, may be directed towards the inside of the body 111. The second face 140*b*, may be an outer face of the cover member 140, at least a part of which, in use, may be directed to face outwardly relative to the body 111. The cover member 140 may include a plurality of layers. The cover member 140 may include a flexible sheet of material. The cover member 140 may include a water-resistant or waterproof portion. The whole of the cover member 140 may be water-resistant or waterproof. The cover member 140 may be manufactured from or include a portion that is formed from a polymer. The cover member 140 may be manufactured from or include a portion that is formed from closed cell foam. The cover member 140 or a portion thereof may be compressible.

The cover member 140 includes an aperture 142. The aperture 142 of the cover member 140 may be configured to be a similar size and or shape to the printing opening 116 of the body 111. The edges 142*a* of the perimeter of the aperture 142 may be smoothed, for example chamfered, for the reasons explained above.

The cover member 140 may include a sealing arrangement similar to that of the cover member 40. The sealing arrangement may include one or more of a sealing member and a plug member as described above.

The cover member 140 may include one or more reinforcement members 148 to strengthen the cover member 140. The or each reinforcement member 148 may be provided in the region of the aperture 142. Reinforcement members 148 may surround the aperture 142. The or each reinforcement member 148 may be similar in any or all respects to the or each reinforcement member 48 described above.

The cover member 140 may be mounted for movement relative to the body 111. The cover member 140 may be sandwiched between the inner walls 115*a*, 117*a*, 119*a* and the outer walls 115*b*, 117*b*, 119*b* of the body.

The cover member 140 is moveable between a first, closed position and a second, open position. The cover member 140 may be moveable in a substantially clockwise or anticlockwise direction relative to the body 111. In the first, closed position, a portion of the cover member 140 substantially covers the printing opening 116 of the body 111. In the second, open position, at least a part of the aperture 142 of the cover member 140 is aligned with the printing opening 116.

The casing 110 may include a movement mechanism 130 for moving the cover member 140 relative to the body 11.

The movement mechanism 130 may include an operating member. The operating member may include an engagement member 136. The movement mechanism 130 may include a second engagement member 138. The or each engagement member 136, 138 may be a manually engageable. The or each engagement member 136, 138 may be a handle or knob, for example. The or each engagement member 136, 138 may be provided on the second (outer) face 140*b* of the cover member 140. The or each engagement member 136, 138 may have a length which is similar to, or otherwise corresponds with the width W of the cover member 140, however, it will be appreciated that this is not essential.

The size and/or shape of the or each engagement member 136, 138 may improve and/or optimise the strength and/or rigidity of the cover member 140, for example to reduce the likelihood of deformation and/or tearing of the cover member 140 as a result of torsion and/or shear forces being applied to the cover member 140 when the cover member 140 is moved relative to the body 111.

The movement mechanism 130 may include an opening 118 in the first side wall 117 of the body 111 (see FIG. 5). Where the body 111 (in particular the side wall 117) is double walled, the opening 118 may be provided only in the outer wall 117*b* of the first side wall 117. The opening 118 may have a first end 118*a* and a second end 118*b*. The opening 118 may be a slot. The opening 118 may be a pair of slots, each having a first end 118*a* and a second end 118*b*. The first engagement member 138 may include a portion which extends through the opening 118. The movement mechanism 130 may include a second opening 120 in the second side wall of the body 111. Where the body 111 (in particular the side wall 119) is double walled, the second opening 120 may be provided only in the outer wall 119*b* of the second side wall 119. The second opening 120 may have a first end 120*a* and a second end 120*b*. The second opening 120 may be a slot. The second opening 120 may be a pair of slots, each having a first end 120*a* and a second end 120*b*. The second engagement member 138 may include a portion which extends through the second opening 120. The or each of the first and second engagement member 136, 138 may be slidable along the respective opening 118, 120. The length of the or each opening 118, 120 may be selected to enable a sufficient travel distance of the cover member 140 relative to the body 111 to move the cover member 140 between its closed position and its open position. The or each opening 118, 120 may be positioned such that a part of the cover member 140 covers the or each opening 118, 120 at least when the cover member 140 is in a closed position relative to the body 111. The or each opening 118, 120 may be positioned such that a part of the cover member 140 always covers the or each opening 118, 120, regardless of whether the cover member 140 is in an open position or a closed position.

In use, the body 111 of the casing 110 is positioned around the at least a part of the printing apparatus 12 to form a printing assembly. A part of the printing apparatus 12 (e.g., a cassette plate) may be positioned adjacent the body 111, to substantially close the casing 110. The cover member 140 may be manually or automatically positioned in a default position. The default position may be the open position or the closed position. In the open position, the aperture 142 of the cover member 140 is at least partially aligned with the printing opening 116, such that a part of the printing apparatus 12 (i.e., a part of the printhead 14) is able to extend at least partially through the printing opening 116 and the aperture 142. In the open position of the cover member 140, the printing apparatus 12 is able to carry out a printing operation on to a substrate which may be located externally of the casing 110.

When the cover member 140 is in the open position the sealing member (where provided) may be positioned around the printing opening 16 of the body 111, so as to protect against the ingress of particles, e.g., dust, and/or liquids between the cover member 140 and the body 111.

When the cover member 140 is to be moved between the open position and the closed position, one or both of the engagement members 136, 138 are moved to move the cover member 140 relative to the body 111.

FIG. 5 shows the cover member 140 in a closed position. When the cover member 140 is in the closed position, the cover member 140 covers or substantially covers the printing opening 116 of the body 111, such that the casing 110 is sealed. A part of the aperture 142 is adjacent the first side wall 117, in the example shown. It will be appreciated that there may be more than one position of the cover member 140 relative to the body 111 which provides a closed position. The aperture 142 of the cover member 140 may be positioned such that no part of the aperture 142 is aligned with the printing opening 116 in the closed position. The cover member 140 substantially covers and seals the printing opening 116.

It will be understood that at least the second face 140*b* of the cover member 140 is positioned sufficiently closely to the body 111, for example where the body 111 is double-walled, the cover member 140 may be sandwiched sufficiently tightly between the inner wall 115*a* and the outer wall 115*b* of the first wall 115 (and preferably the inner walls 117*a*, 119*a*, and the outer walls 117*b*, 119*b* of the first and second side walls 117, 119) that the printing opening 116 is adequately sealed by the cover member 140, so as to meet the desired ingress protection (IP) rating. Where at least a part (for example a layer) of the cover member 140 is manufactured from a compressible material, for example closed cell foam, the cover member 140 is compressed against the body 111, for example around the perimeter of the printing opening 116, so as to provide an adequate seal. It will be understood that the seal between the cover member 140 and the body 111 may be broken by operation of the movement mechanism 130. In other words, the seal is a temporary seal.

Where provided, the plug member may be substantially aligned with the printing opening 116 in the closed position. The plug member may engage with the printing opening 116 so as to enhance a seal between the cover member 140 and the body 111, so as to protect against the ingress of solids and/or liquids into the casing 110 when the cover member 140 is in the closed position.

In the example shown in FIG. 5, the cover member 140 is in a closed position in which the first engagement member 136 is positioned at towards the first end 118*a* of the first opening 118 and the second engagement member 138 is positioned towards the second end 120*b* of the second opening 120. To move the cover member 140 to an open position relative to the body 111, one or both of the engagement members 136, 138 is moved towards the other end 118*b*, 120*a* of its respective opening 118, 120. It will be appreciated that the cover member 140 may reach the open position before each engagement member 136, 138 has reached the other end 118*b*, 120*a* of its respective opening 118, 120. Engagement and movement of one of the engagement members 136, 138 may be sufficient to cause movement of the other engagement member 136, 138 along its respective opening 118, 120. This may depend on the rigidity of the cover member 140. It will be understood that this is one of at least two alternative methods of moving the cover member 140 from its closed position to its open position; and is explained as an example only.

The cover member 140 may be moved relative to the body 111 in response to a signal. Movement of the cover member 140 may be controlled manually, mechanically or electrically, for example. The or each movement mechanism 130 may be operable manually, mechanically or electrically, for example. The or each engagement member 136, 138 may be moveable relative to the or each respective opening 118, 120 by a motor or motors, for example. A control device 172 may provide a signal to control the movement of the cover member 140 relative to the body 111. The control of movement of the cover member 140 may be in response to a programmed or timed routine, or may be in response to an input, for example a user input. The control device 172 is shown in dashed lines since its position is not significant. It may be positioned internally or externally of the casing 110.

The control device 72, 172 which is capable of controlling the movement of the cover member 40, 140 relative to the respective body 11, 111 may be part of a control system 70, 170. The control system 70, 170 may be operable to control printing operations, etc. of the printing apparatus 12, by operation of a printing apparatus control device. The control device 72, 172 may be the same as or separate from such a printing apparatus control device.

The control device 72, 172 may be operable to control the opening and closing of a plurality of casings 10, 110, by controlling the movement of the respective movement mechanism 30, 130 of each casing 30, 130. It will be understood that where a plurality of casings 10, 110 are controlled, they may be opened and closed in a sequence or simultaneously, for example, i.e., in any appropriate or desired manner.

The control system 70, 170 may determine or monitor the position and/or movement of the cover member 40, 140 relative to the body 11, 111. The control system may include one or more sensors and one or more sensed elements for detecting the position of the cover member 40, 140 relative to the body 11, 111. For example, the cover member 40, 140 may include one or more sensed elements 50, 150, for example a metallic or reflective element, and one or more sensors, each of which is operable to detect the presence and/or absence of the or each sensed element 50, 150, to control the or each motor which is responsible for movement of the cover member 40, 140 relative to the body 11, 111. The or each sensed element 50, 150 may act as a switch for controlling operation of the motor as the cover member 40, 140 moves relative to the body 11, 111. It will be understood that the position of the or each sensor and the or each sensed element 50, 150 may be reversed, for example, the or each sensed element 50, 150 may be provided on or near the body 11, 111. One or more of the inner walls 15*a*, 115*a*, 117*a*, 119*a* may include one or more monitoring apertures 52, 152 to facilitate the monitoring of position and/or movement of the cover member 40, 140 relative to the body 11, 111. For example, the or each sensed element 50, 150 may need to be directly sensed, rather than through a part of the body 11, 111, therefore providing one or more monitoring apertures 52, 152, enables direct sensing of the sensed element 50, 150 by a sensor positioned adjacent the monitoring aperture 52, 152. The or each sensor may be positioned inside or outside the body 11, 111.

Additionally or alternatively, the or each motor responsible for the movement of the cover member 40, 140 relative to the body 11, 111 may be controlled by a programmed or timed routine.

The cover member 40, 140 may include one or more cleaning portions 60, 160. The or each cleaning portion 60, 160 may be provided on the first, inner face 40*a*, 140*a* of the cover member 40, 140. The or each cleaning portion 60, 160 may include an abrasive material. The or each cleaning portion 60, 160 may be positioned such that the printhead 14 may be brought into contact with the cleaning portion 60, 160 or one of the cleaning portions 60, 160 during a cleaning operation. The or each cleaning portion 60, 160 may be positioned on the cover member 40, 140 such that the cleaning portion 60, 160 pr at least one of the cleaning portions 60, 160 is positioned adjacent the printhead 14 when the cover member 40, 140 is in a closed position relative to the body 11, 111.

To carry out a cleaning operation, the cover member 40, 140 may be moved relative to the body 11, 111 into a cleaning position. Relative movement between the printhead 14 and the cleaning portion 60, 160 may be carried out, by moving at least one of the printhead 14 and the cover member 40, 140. The abrasive material removes residual ink from the printhead. Residual ink on the printhead can affect performance of the printing apparatus since the print quality can be reduced. Regular, for example daily, cleaning of printheads is recommended. Providing a cleaning portion 60, 160 on the cover member 40, 140, enables printhead cleaning to be carried out at the same time as cleaning the production line, whilst simultaneously providing ingress protection for the printing apparatus 12. The cover member 40, 140 must be stiff enough to be able to withstand the force of the printhead 14 bearing against it during the printhead cleaning operation. The cover member 40, 140 should not distort or break as a result of a printhead cleaning operation. The control system 70, 10 may control the performance of a cleaning operation, controlling the movement of the cover member 40, 140, and/or the printhead 14. The cleaning operation may include one or more of the following steps: moving the cover member 40, 140 to a closed position relative to the body 11, 111, positioning the cleaning portion 60, 160 adjacent or near the printhead 14, moving the printhead 14 and the cover member 40, 140 relative to one another, by movement of one or both of the cover member 40, 140 and the printhead 14; moving the cover member 40, 140 relative to the body 11, 111 to move the cover member 40, 140 to an open position relative to the body 11, 111.

As described and shown herein, the cover member 40, 140 is moveable "side to side" between the open and closed positions. However, it will be understood that the cover member 40, 140 may additionally or alternatively move "front to back" relative to the body 11, 111. In other words, first and second directions of movement of the cover member 40, 140 relative to the body 11, 111 may cause the position of the aperture 42, 142 of the cover member 40, 140 to alter relative to the side walls 17, 19, 117, 119. The cover member 40, 140 may additionally or alternatively move in directions substantially perpendicular to the first and second directions, such that the aperture 42, 142 of the cover member 40, 140 moves relative to the opening 16, 116, between the open and closed positions (in the directions shown by the double-headed arrow A in FIG. 8), but does not substantially move relative to the side walls 17, 19, 117, 119.

Figure 8:
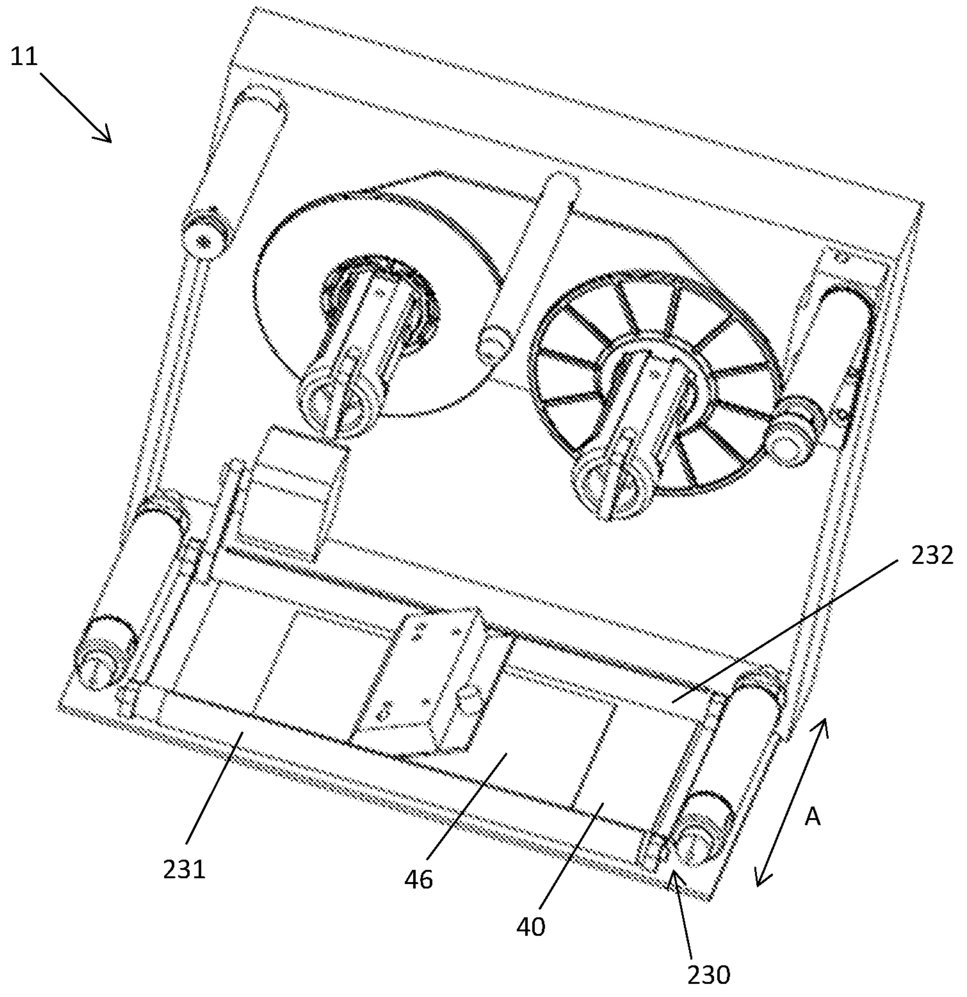
FIG. 8 is a perspective view of an alternative arrangement of a part of a casing.

It will be understood that the arrangement of the features provided to enable movement of the cover member 40, 140 will be appropriate to the direction(s) of movement of the cover member 40, 140. A movement mechanism 230 may be provided which is similar to one of the movement mechanisms 30, 130, described above. FIG. 8 shows a pair of rollers 231, 232 which operate in a similar fashion to the rollers 31, 32, but which are oriented substantially perpendicularly relative to the body 11, compared with the orientation of the rollers 31, 32. The cover member 40 of FIG. 8 is moveable by rotating one or both of the rollers 231, 232.

The casing as disclosed herein provides ingress protection which does not require separate bags or covers. The cover member provides integrated ingress protection, which, being integrated with the printing assembly, is always available, and is quick and simple to operate. The printing apparatus or parts thereof do not have to be removed from the printing assembly during cleaning of the production line to protect the printing apparatus from the ingress of liquids and or solids.

The addition of the cleaning portion enables a printhead cleaning operation to be carried out simultaneously with a cleaning process for the production line in which the printing assembly is installed. This saves time and labour.

When used in this specification and claims, the terms "seal" or "sealed" will be understood to mean that the casing 10, 110 has a desired or required ingress protection (IP) rating, for example IP54.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. A casing for a printing apparatus, the casing including a body configured to house at least a part of a printhead and having a printing opening, and a cover member having an aperture, wherein the cover member is moveable relative to the body between an open position in which at least a part of the aperture of the cover member is aligned with the printing opening of the body, such that a part of the printhead housed in the body extends through the printing opening of the body and the aperture of the cover member to enable a printing operation to be carried out, and a closed position in which at least a part of the cover member closes the printing opening of the body.

2. A casing according to claim 1 including a movement mechanism for moving the cover member relative to the body.

3. A casing according to claim 2 wherein the movement mechanism includes at least one roller around which a part of the cover member is able to be wound.

4. A casing according to claim 2 wherein the movement mechanism includes at least one engagement member provided on the cover member and at least one respective opening in the body, wherein a part of the or each engagement member extends through its respective opening.

5. A casing according to claim 1 wherein movement of the cover member relative to the body is controlled electrically.

6. A casing according to claim 1 wherein when the cover member is in the closed position relative to the body, the cover member provides protection against ingress of solids and/or liquids into the casing.

7. A casing according to claim 1 wherein the cover member includes a cleaning portion for cleaning the printhead.

8. A printing assembly including a printhead and a casing according to claim 1 for housing the printhead.

9. A control system for a printing assembly according to claim 8, wherein the control system includes a control device which is operable to control the movement of the cover member relative to the body.

10. A control system according to claim 9 wherein the control device is operable to control a plurality of printing assemblies.

11. An operation method of a printing assembly of claim 8, wherein the method includes controlling the movement of the cover member relative to the body of the casing, between the open position and the closed position.

12. An operation method according to claim 11 wherein the method further includes controlling movement of the printhead between a printing position and a non-printing position.

13. An operation method according to claim 11 wherein the method includes a printhead cleaning operation.

14. An operation method according to claim 12 wherein the method includes a printhead cleaning operation.

15. An operation method according to claim 13 wherein the printhead cleaning operation includes at least one of the following steps:

moving the cover member to a closed position relative to the body;

positioning the cleaning portion adjacent or near the printhead;

moving the printhead and the cover member relative to one another, by movement of one or both of the cover member and the printhead;

moving the cover member relative to the body to move the cover member to an open position relative to the body.

16. An operation method according to claim 11 including controlling the operation of a plurality of printing assemblies, each respective printing assembly of the plurality of printing assemblies comprising:

a respective printhead; and a respective casing for housing the respective printhead including a respective body having a printing opening, and a respective cover member having an aperture, wherein the respective cover member is moveable relative to the respective body between an open position in which at least a part of the aperture of the respective cover member is aligned with the printing opening of the respective body, and a closed position in which at least a part of the respective cover member closes the printing opening of the respective body.

17. A casing according to claim 1 for a thermal transfer printing apparatus, wherein the printhead is a thermal printhead and the casing is configured to house rotatable spools for carrying inked ribbon.

18. A printing assembly according to claim 8 wherein the printing assembly is a thermal transfer printer, wherein the printhead is a thermal printhead and the printhead further comprises rotatable spools configured to carry reels of inked ribbon.

19. A casing according to claim 1 wherein movement of the cover member relative to the body is controlled manually.

20. A casing according to claim 1 wherein movement of the cover member relative to the body is controlled mechanically.

* * * * *